UNITED STATES PATENT OFFICE.

THOMAS W. BYRNE, OF BOSTON, MASSACHUSETTS.

PROCESS OF MAKING ELECTRIC BATTERIES.

1,259,485.

Specification of Letters Patent.  Patented Mar. 19, 1918.

No Drawing.  Application filed January 7, 1916.  Serial No. 70,720.

*To all whom it may concern:*

Be it known that I, THOMAS W. BYRNE, a citizen of the United States, residing at Boston, in the county of Suffolk and State of Massachusetts, have invented certain new and useful Improvements in Processes of Making Electric Batteries; and I do hereby declare the following to be a full, clear and exact description of the invention, such as will enable others skilled in the art to which it appertains to make and use the same.

The present invention relates to electric batteries, and more particularly to a method or process of making the same.

The object of the present invention is to devise an improved method or process of making electric batteries and especially batteries of the so-called dry or semi-dry type which shall be more efficient in operation, and which for the same size or bulk shall have greater capacity, and shall maintain a higher voltage and lower resistance than the batteries constructed in accordance with any of the methods heretofore known and practised. With this object in view, the present invention consists in the process or method of making batteries hereinafter described and more particularly defined in the claims.

It has heretofore been the practice in constructing many of the well-known batteries of the so-called dry type, first to line the can which comprises the zinc element with one or more layers of absorbent or bibulous sheet material, such as blotting paper moistened with the electrolytic solution. The solid carbon electrode or stick was then held centered in the can while the depolarizing and conducting mixture also previously moistened with the electrolyte, was filled around it. I have discovered that if I add the depolarizing and conducting mixture while in a substantially dry condition, I am enabled to introduce a greatly increased amount of mixture into the container and around the carbon electrode, and am further enabled to compact this tightly under a very heavy pressure which results in a very substantial increase in the life or capacity of the battery, and a higher voltage and reduced internal resistance during the latter stages of discharge. I have also discovered that when the depolarizing and conducting mixture is free from soluble material so that there will be no dissolving of any of the compacted mixture with an accompanying loosening or softening of the mixture within the battery, the latter will tend to maintain in service a higher voltage and lower internal resistance.

In constructing a well-known form of battery in accordance with my improved process, the depolarizing and conducting mixture, in a substantially dry condition, is packed under very heavy pressure in the can and around the carbon element. Any suitable means or device may be employed, either hand or machine operated, preferably a power-actuated series or gang of tamping rods mounted on a vertically reciprocating head or carrier being used. When, as is preferred, the depolarizing and conducting mixture is unmixed with any soluble material, such as sal ammoniac or other electrolytic chemical which would attack steel, the tamping rods may be of steel instead of wood, as was necessary when the mixture was first moistened with such an electrolyte. A very substantially heavier pressure can be applied when steel rods are employed than when wood is used, as the latter are more yielding or elastic, besides being of comparatively short life.

In order to reduce the liability of any of the particles of depolarizing and conducting mixture passing through the insulating lining of blotting paper or other material and into contact with the zinc element, thus internally short circuiting the battery and ruining it, I prefer before filling the battery to coat this lining with a paste made of flour, starch, or other suitable material and electrolytic solution.

After the battery has been filled to the desired height with the compacted mixture the electrolytic liquid is added. Where the electrolytic material is contained in the compacted material, this liquid may be water only, but preferably the liquid will be a solution of the electrolytic material. The liquid is added to the battery either by pouring the solution into the top of the battery or submerging the latter in a tank or receptacle containing the solution. Owing to the high degree of compactness obtainable with the present method, the absorption of the electrolytic liquid may be slow and possibly incomplete, especially where the maximum pressure is employed in compacting the materials.

Accordingly I prefer to first subject the battery to a substantial vacuum, and then to apply the solution under pressure. I have found that a vacuum of 28 inches of mercury maintained for three hours, and then followed by an application of the electrolytic solution under 70 lbs. pressure for ten hours was sufficient to thoroughly impregnate the battery with the electrolytic solution.

The battery is finally sealed in any suitable manner.

Wherever in the specification and claims the mixture is referred to as "substantially dry" this is to be understood as defining the absence of a sufficient quantity of moisture which would be necessary for the practical operation of the battery, or which would interfere with the proper compacting of the mixture. As a matter of fact, a slight moistening of the materials may be required in order to permit proper handling of the same, as well as for other reasons.

While the improved process has been described in connection with the manufacture of a so-called "dry battery," in which the mixture is compacted in the first instance in a zinc can or similar container, it is to be understood that the invention is not necessarily to be limited thereto, but may be used in the manufacture of other types of batteries or parts thereof, such, for example, as the bag and paste or semi-dry battery, so-called, in which the mixture would be compacted around the carbon element and in a fabric bag or similar suitable container, held preferably in a mold during the compacting operation, and then inserted in the zinc element or can after which paste containing the electrolytic solution would be poured into the can and around the bag. Nor is the present invention limited to a process which includes all the steps above described, or any particular steps, except as hereinafter recited in the claims.

The invention having been described, what is claimed is:—

1. The process of making dry batteries which consists in compacting tightly in a container and around the carbon element the depolarizing mixture in substantially dry condition and unmixed with soluble material, applying the solution of electrolytic material to the compacted mixture, and sealing the cell.

2. The process of making dry batteries which consists in compacting tightly in a container around the carbon element the depolarizing mixture in a substantially dry condition, subjecting the compacted mixture to a substantial vacuum, applying an excess of the electrolytic liquid to the compacted mixture, removing the excess, and sealing the cell.

3. The process of making dry batteries which consists in compacting tightly in a container around the carbon element the depolarizing mixture in a substantially dry condition, applying an excess of the electrolytic liquid under pressure to the compacted mixture, removing the excess, and sealing the cell.

4. The process of making dry batteries which consists in lining the interior of the zinc container with absorbent and insulating material provided with a protective coating of paste, compacting tightly in the container and around the carbon element the depolarizing mixture in a dry condition and unmixed with soluble material, subjecting the battery to a substantial vacuum, applying an excess of the solution of electrolytic material under pressure to the battery, removing the excess, and sealing the cell.

THOMAS W. BYRNE.